3,826,840
3-(4 - METHYL-3-CYCLOHEXENYL)BUTYL ESTERS AND EPOXIDIZED DERIVATIVES THEREOF AS INSECT JUVENILE HORMONE MIMICKING COMPOUNDS AND INSECTICIDES
Jerry G. Strong, Westfield, N.J., assignor to Mobil Oil Corporation
No Drawing. Filed June 14, 1971, Ser. No. 153,058
Int. Cl. A01n 9/24
U.S. Cl. 424—305   6 Claims

ABSTRACT OF THE DISCLOSURE 3-(4-Methyl-3-cyclohexenyl)butyl esters and epoxidized derivatives thereof are a class of compounds useful for insect control. In particular, such compounds are useful for contacting various metamorphological stages of insects, especially the larval and adult stages, resulting in insect mortality or in severe adult insect abnormalities, such as undeveloped wings and abdomens, and inhibited reproduction.

CROSS-REFERENCE TO RELATED APPLICATIONS

Serial No.'s 153,056, now pending, and 153,057, now U.S. 3,773,824, filed on the same date, herewith, and entitled 3 - (3,4 - Epoxy - 4 - Methylcyclohexyl) Butyl Esters and 3-(4-Methyl-3-Cyclohexenyl)Butyl Esters of Organic Acids, respectively, relate to certain novel 3-(3,4-epoxy-4-methylcyclohexyl)butyl esters and 3-(4-methyl-3-cyclohexenyl)-butyl esters, respectively, useful as fungicides and plant growth regulating agents.

BACKGROUND OF THE INVENTION

Field of the Invention

This invention is directed to novel use of 3-(4-methyl-3-cyclohexenyl)butyl esters and epoxidized derivatives thereof as highly effective insect juvenile hormone mimicking compounds and insecticides.

DESCRIPTION OF THE PRIOR ART 3-(4-Methyl-3-cyclohexenyl)butyl esters of simple alkyl carboxylic acids, including the ester of cyclopropanecarboxylic acid, are disclosed in United States Pat. No. 2,556,150 as compounds having desirable and persistent odors.

France Pat. No. 2,007,187 discloses certain specific derivatives of cyclohexene as insecticides.

SUMMARY OF THE INVENTION

This invention provides for use in controlling insects compounds having the formulas:

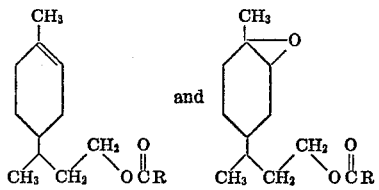

wherein R is a member selected from the group consisting of hydrogen, phenyl, heterocyclic aryl, heterocyclic alkyl, cycloalkyl of 3–12 carbon atoms, alkyl of 1–12 carbon atoms, alkenyl of 2–12 carbon atoms, alkynyl of 2–12 carbon atoms, epoxyalkyl of 2–6 carbon atoms, aralkyl, diaralkyl and combinations thereof as parts of the same radical, which radical may have substituted thereon one or more members selected from the group consisting of hydrogen, halogen (e.g., fluorine, chlorine, and bromine), nitro, alkoxy of 1–4 carbon atoms, aryl, aroyl, acetyl, cyano, mercapto, alkyl mercapto of 1–4 carbon atoms, hydroxy, carbalkoxy of 2–4 carbon atoms, carboxy, alkylamino of 1–4 carbon atoms, amide, alkyl of 1–6 carbon atoms, alkenyl of 2–6 carbon atoms, cycloalkyl of 3–6 carbon atoms, epoxyalkyl of 2–6 carbon atoms and combinations thereof; and insect controlling compositions comprising at least one such compound and a carrier therefor.

DESCRIPTION OF SPECIFIC EMBODIMENTS

As will be noted from the formulas, the compounds of this invention are 3-(4-methyl-3-cyclohexenyl)butyl esters and their epoxidized derivatives. Non-limiting examples of compounds for use in this invention include:

Isobutyric acid, 3-(4-methyl-3-cyclohexenyl)butyl ester;
Cyclobutanecarboxylic acid, 3-(4-methyl-3-cyclohexenyl) butyl ester;
Cyclobutanecarboxylic acid, 3-(4-methyl-3-cyclohexenyl) butyl ester;
2-Chlorocyclopropanecarboxylic acid, 3-(4-methyl-3-cyclohexenyl)butyl ester;
2-Cyanocyclopropanecarboxylic acid, 3-(4-methyl-3-cyclohexenyl)butyl ester;
2-Methoxycyclopropanecarboxylic acid, 3-(4-methyl-3-cyclohexenyl)butyl ester;
2-Methylthiocyclopropanecarboxylic acid, 3-(4-methyl-3-cyclohexenyl)butyl ester;
2-Methylcyclopropanecarboxylic acid, 3-(4-methyl-3-cyclohexenyl)butyl ester;
3.3-Dimethylcyclopropanecarboxylic acid, 3-(4-methyl-3-cyclohexenyl)butyl ester;
3,3,4,4-Tetramethylcyclopropanecarboxylic acid, 3-(4-methyl-3-cyclohexenyl)butyl ester;
3,3-Dimethyl-4-alkylcyclopropanecarboxylic acid, 3-(4-methyl-3-cyclohexenyl)butyl ester;
Chrysanthemumic acid, 3-(4-methyl-3-cyclohexenyl)butyl ester;
Cyclopropaneacetic acid, 3-(4-methyl-3-cyclohexenyl) butyl ester;
3-Cyclopropanepropionic acid, 3-(4-methyl-3-cyclohexenyl)butyl ester;
Acrylic acid, 3-(4-methyl-3-cyclohexenyl)butyl ester;
Crotonic acid, 3-(-methyl-3-cyclohexenyl)butyl ester;
Cinnamic acid, 3-(4-methyl-3-cyclohexenyl)butyl ester;
Acetoacetic acid, 3-(4-methyl-3-cyclohexenyl)butyl ester;
2-Methacrylic acid, 3-(4-methyl-3-cyclohexenyl)butyl ester;
2-Ethylacrylic acid, 3-(4-methyl-3-cyclohexenyl)butyl ester;
2,3-Dimethylacrylic acid, 3-(4-methyl-3-cyclohexenyl) butyl ester;
3-Methylbutenoic acid, 3-(4-methyl-3-cyclohexenyl)butyl ester;
3-Ethylpentenoic acid, 3-(4-methyl-3-cyclohexenyl)butyl ester;
2,3-Epoxy-2-methylpropionic acid, 3-(4-methyl-3-cyclohexenyl)butyl ester;
2,3-Epoxypropionic acid, 3-(4-methyl-3-cyclohexenyl) butyl ester;
2,3-Epoxybutyric acid, 3-(4-methyl-3-cyclohexenyl)butyl ester;
2,3-Epoxy-3-methylbutyric acid, 3-(4-methyl-3-cyclohexenyl)butyl ester;
Isobutyric acid, 3-(3,4-epoxy-4-methylcyclohexyl)butyl ester;
Cyclobutanecarboxylic acid, 3-(3,4-epoxy-4-methylcyclohexyl)butyl ester;
Cyclohexanecarboxylic acid, 3-(3,4-epoxy-4-methylcyclohexyl)butyl ester;
2-Chlorocyclopropanecarboxylic acid, 3-(3,4-epoxy-4-methylcyclohexyl)butyl ester;
2-Cyanocyclopropanecarboxylic acid, 3-(3,4-epoxy-4-methylcyclohexyl)butyl ester;

2-Methoxycyclopropanecarboxylic acid, 3-(3,4-epoxy-4-methylcyclohexyl)butyl ester;
2-Methylthiocyclopropanecarboxylic acid, 3-(3,4-epoxy-4-methylcyclohexyl)butyl ester;
2-Methylcyclopropanecarboxylic acid, 3-(3,4-epoxy-4-methylcyclohexyl)butyl ester;
3,3-Dimethylcyclopropanecarboxylic acid, 3-(3,4-epoxy-4-methylcyclohexyl)butyl ester;
3,3,4,4-Tetramethylcyclopropanecarboxylic acid, 3-(3,4-epoxy-4-methylclclohexyl)butyl ester;
3,3-Dimethyl-4-allylcyclopropanecarboxylic acid, 3-(3,4-epoxy-4-methylcyclohexyl)butyl ester;
Chrysanthemumic acid, 3-(3,4-epoxy-4-methylcyclohexyl)butyl ester;
Cyclopropaneacetic acid, 3-(3,4-epoxy-4-methylcyclohexyl)butyl ester;
3-Cyclopropanepropionic acid, 3-(3,4-epoxy-4-methylcyclohexyl)butyl ester;
Acrylic acid, 3-(3,4-epoxy-4-methylcyclohexyl)butyl ester;
Crotonic acid, 3-(3,4-epoxy-4-methylcyclohexyl)butyl ester;
Cinnamic acid, 3-(3,4-epoxy-4-methylcyclohexyl)butyl ester;
Acetoacetic acid, 3-(3,4-epoxy-4-methylcyclohexyl)butyl ester;
2-Methacrylic acid, 3-(3,4-epoxy-4-methylcyclohexyl)butyl ester;
2-Ethylacrylic acid, 3-(3,4-epoxy-4-methylcyclohexyl)butyl ester;
2,3-Dimethylacrylic acid, 3-(3,4-epoxy-4-methylcyclohexyl)butyl ester;
3-Methylbutenoic acid, 3-(3,4-epoxy-4-methylcyclohexyl)butyl ester;
3-Ethylpentenoic acid, 3-(3,4-epoxy-4-methylcyclohexyl)butyl ester;
2,3-Epoxy-2-methylpropionic acid, 3-(3,4-epoxy-4-methylcyclohexyl)butyl ester;
2,3-Epoxypropionic acid, 3-(3,4-epoxy-4-methylcyclohexyl)butyl ester;
2,3-Epoxybutyric acid, 3-(3,4-epoxy-4-methylcyclohexyl)butyl ester; and
2,3-Epoxy-3-methylbutyric acid, 3-(3,4-epoxy-4-methylcyclohexyl)butyl ester.

The ester compounds of the above formulas for use in this invention may be prepared according to the following procedures I, II and III. The epoxidized derivatives thereof are readily prepared by the two following general procedures IV and V.

Procedure I 3-(4-Methyl-3-cyclohexenyl)butanol and an appropriately substituted carboxylic acid halide are mixed in a suitable solvent, if desired, and with a suitable acid accepting agent, if desired. Non-limiting examples of solvents for use in this procedure include ethyl ether, benzene, toluene, hexane, heptane and chloroform. Non-limiting examples of acid accepting agents for use in this procedure include trialkylamines, arylamines, pyridine and sodium carbonate. The resulting mixture is stirred and heated, if desired, for an appropriate time, and then washed with water, dried and evaporated to yield the desired product.

Procedure II 3-(4-Methyl-3-cyclohexenyl)butanol is condensed by acid catalyzation with an appropriately substituted carboxylic acid in a suitable inert solvent, if a solvent is desired. Water is removed as a by-product. Non-limiting examples of acid catalysts for use in this procedure include hydrochloric acid, sulfuric acid, p-toluenesulfonic acid and phosphoric acid. Non-limiting examples of solvents for use in this procedure include toluene, benzene and xylene.

Procedure III 3-(4-Methyl-3-cyclohexenyl)butanol is condensed with an appropriately substituted acetic acid anhydride, non-limiting examples of which are a cyclic anhydride such as for example, succinic anhydride, and a non-cyclic anhydride, such as, for example, 2-chloroacetic anhydride.

Procedure IV 3-(3,4-Epoxy-4-methylcyclohexyl)butanol, prepared by the $m$-chloroperbenzoic acid epoxidation of 3-(4-methyl-3-cyclohexenyl)butanol, and an appropriate carboxylic acid halide are mixed in a suitable solvent, if desired, and with a suitable acid accepting agent, if desired. Non-limiting examples of solvents for use in this procedure include ethyl ether, chloroform, methylene chloride, benzene, toluene, hexane and heptane. Nonlimiting examples of suitable acid accepting agents for use in this procedure include trialkylamines, triarylamines, pyridine and sodium carbonate. The resulting mixture is stirred and heated, if desired, for an appropriate time, and then washed with water, dried and evaporated to afford the desired product.

Procedure V

Appropriate 3-(4-methyl-3-cyclohexenyl)butyl esters of carboxylic acids are mixed with a suitable epoxidizing agent in a suitable solvent. Non-limiting examples of suitable epoxidizing agents include $m$-chloroperbenzoic acid, perbenzoic acid, peracetic acid, perisophthalic acid, hydrogen peroxide and oxygen with suitable metal ion catalysts. Non-limiting examples of suitable solvents include ethyl ether, benzene, toluene, chloroform, methylene chloride, hexane and heptane. The resulting mixture is stirred and cooled, if desired, for an appropriate time, and then filtered, washed with aqueous base, dried and evaporated to afford the desired product.

The following examples demonstrate the typical procedures.

EXAMPLE 1

Cyclopropanecarboxylic Acid, 3-(4-Methyl-3-Cyclohexenyl)Butyl Ester

A 30 ml. solution of 6.4 g. (0.06 mole) of cyclopropane carboxylic acid chloride in ethyl ether was added dropwise to a stirred solution of 10.0 g. (0.06 mole) of 3-(4-methyl-3-cyclohexenyl)butanol and 12.2 g. (0.12 mole) of triethylamine in 150 ml. of ethyl ether. After stirring overnight at ambient temperature, the precipitated salts were removed by filtration and the filtrate was washed with 5% sodium hydroxide and with brine, dried over magnesium sulfate and concentrated. The liquid residue was distilled through a short path apparatus to afford 8.4 g. of pure cyclopropanecarboxylic acid, 3-(4-methyl-3-cyclohexenyl)butyl ester as a clear, colorless liquid, with a boiling point of 132–135° C. at 0.5 mm.

IR Analysis—($\lambda_{max.}$ film) 3.5 (s), 5.8 (s), 6.9 (m), 8.6 (s), 12.5 (w) microns;

NMR Analysis—($\delta$ CDCl$_3$) 5.31 (1H, m), 4.11 (2H, t), 0.90 (5H, m) p.p.m.;

MS Analysis—(molecular ion) 236.

EXAMPLE 2

Cyclopropanecarboxylic Acid, 3-(3,4-Epoxy-4-Methylcyclohexyl)Butyl Ester

A 4.2 g. (0.02 mole) sample of 85% $m$-chloroperbenzoic acid was added portionwise over 15 minutes to a stirred, cooled (0° C.) solution of 4.7 g. (0.02 mole) of the product compound of Example 1 in 250 ml. of methylene chloride. The temperature rose 10° C. during the addition and to ambient after the cooling bath was removed. After stirring overnight, sufficient 5% sodium hydroxide was added to dissolve the precipitated acid and the organic layer was separated, washed with 5% sodium hydroxide and with brine, dried over magnesium sulfate and concentrated. Obtained was 4.1 g. of pure cyclopropanecarboxylic acid, 3 - (3,4-epoxy-4-methylcyclohexyl) butyl ester as a clear, colorless liquid.

IR Analysis—($\lambda_{max}$. film) 3.5 (s), 5.9 (s), 6.9 (m), 8.6 (s), 11.8 (m);

NMR Analysis—($\delta$ CDCl$_3$) 4.11 (2H, t), 3.05 and 3.0 (1H, d, and s), 0.96 (5H, m) p.p.m.;

MS Analysis—(molecular ion) 252.

Particularly suitable embodiments of the present invention are the cyclopropanecarboxylic acid, 3-(4-methyl-3-cyclohexenyl)butyl ester and cyclopropanecarboxylic acid, 3-(3,4-epoxy-4-methylcyclohexyl)butyl ester. These are embodiments used for illustrating this invention as set forth in the activity shown by such compounds in the results of insecticidal tests and insect juvenile hormone mimicking tests set forth in the table following the test descriptions.

INSECT JUVENILE HORMONE MIMICKING TEST

Five third- and fourth-instar larvae of the Mexican Bean Beetle species representing the Lepidoptera order are immersed in 500 p.p.m. acetone-water concentrations of the test compounds. In this way, the insects are subjected to both a contact dip and stomach poison type treatment as a certain amount of the test compound is orally ingested during the immersion time. Treated insects are confined in microcages with fresh foliage being introduced daily for food until pupation is reached. Each of the insects per treatment is carefully observed for any abnormalities after adult emergence.

INSECTICIDE TESTING METHODS

Mexican Bean Beetle—*Epliachna varivestis* Mulsant

Lima bean leaves of uniform size are momentarily dipped in a 500 p.p.m. water-acetone solution of the test compound. When dry, the treated leaf is placed in a screened petri dish and exposed to 10 fourth-instar larvae. The percent mortality is recorded after 48 hours.

Southern Armyworm—*Prodenia eridania* Cramer

This test is carried out as described for the Mexican Bean Bettle, using 10 fourth instar larvae and observing mortality after 48 hours.

Two-Spotted Spider Mite—*Tetranychus telarius* Linnaeus

Infested trifoliate bean leaves (Henderson bush line) are selected that have as many as 20 adult mites per leaf. Leaves with mites attached are momentarily dipped into a 500 p.p.m. emulsion, solution, or suspension of the test compounded and then placed (petiole only) in a 4 oz. bottle of water for observation. Percent mortality is observed after 72 hours.

SPRAY TESTS

Housefly—*Musca domestica* Linnaeus

Adult houseflies are contained in 100 mm. petri dish screened cages and exposed to a spray of 10 ml. acetone solution of test compound. A concentration of 500 p.p.m. is used, with 10 flies in each cage. Percent mortality is observed after twenty-four hours.

TABLE

| Compound of example | Insect juvenile hormone activity on Mexican Bean beetle |
|---|---|
| 1 | 80% of treated insects failed to develop into normal adults. Wings were undeveloped and abdomens remained as in the pupa form, while the head and thorax developed as in a normal adult insect. |
| 2 | 80% of treated insects failed to develop into normal adults. Wings were undeveloped and abdomens remained as in the pupa form, while the head and thorax developed as in a normal adult insect. |

| | Insecticidal activity (percent effectiveness) against | | | |
|---|---|---|---|---|
| | Mexican bean beetle | Spider mite | Southern armyworm | Housefly |
| 1 | 10 | 40 | 10 | 20 |
| 2 | 60 | 80 | 20 | 10 |

From the data in the table, it will be noted that the compounds for use in the present invention, specifically for purposes of demonstrating the insecticidal and insect juvenile hormone mimicking activities of the particularly suitable embodiments of Examples 1 and 2, have a broad range of insect control activity. When third- and fourth-instar larvae are contacted with the compounds of this invention, 80% fail to develop into normal, reproducing adults.

The compounds of this invention have been found to exhibit considerable biological activity and are especially potent insect control agents when used against important agricultural pests. These compounds may be used in various ways to achieve biological action. They can be applied per se, as solids or in vaporized form, but are preferably applied as the toxic components in insect control compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers and the like. A wide variety of liquid and solid carriers can be used in the insect control compositions. Non-limiting examples of liquid carriers include water; organic solvents such as alcohols, ketones, amides and esters; mineral oils such as kerosene, light oils, medium oils; and vegetable oils such as cottonseed oil. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

The amount of the compounds of this invention utilized in insect control compositions will vary rather widely. It depends to some extent upon the type of composition in which the material is being used, the nature of the condition to be controlled, and the method of application (i.e., spraying, dusting, etc.). In the ultimate insect control composition, as applied in the field, insect control agent concentrations as low as 0.0001 weight percent of the total composition can be used. In general, compositions, as applied containing about 0.05 weight percent insect control agent in either liquid or solid carrier give excellent results. In some cases, however, stronger dosages up to about 10 weight percent may be required.

In practice, insect control compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted prior to application, by dispersing it in water to obtain a sprayable suspension containing the concentration of insect control agent desired for application. Other concentrates can be solutions that can be later diluted, e.g., with kerosene. Thus, it is within the contemplation of this invention to provide insect control compositions containing up to about 80 percent, by weight of the composition, of an insect control compound of this invention. Accordingly, depending upon whether it is ready for application or it is in concentrated form, the contemplated insect control compositions contain between about 0.0001 percent and about 80 percent, by weight of the composition, of an insect control compound of this invention and a carrier, liquid or solid, as defined hereinbefore.

Although the present invention has been described with preferred embodiments, it is to be understood that modifications and variations may be resorted to without departing from the spirit and scope of this invention, as those skilled in the art will readily understand.

What is claimed is:

1. A method for controlling insects, which comprises contacting said insects when in the adult stage with an insecticidally effective amount and when in the larval stage contacting larvae with an effective juvenile hormone mimicking amount of a compound having the following formula:

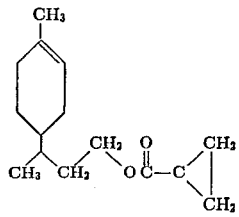

2. The method as defined in claim 1, wherein said control is insect juvenile hormone mimicking.

3. The method as defined in claim 1, wherein said control is insecticidal.

4. A composition for controlling insects comprising from about 0.0001 to about 80 percent by weight of the composition of a compound defined by claim 1 and a carrier therefor wherein the compound is present in an insecticidally-effective amount when contacting insects in the adult stage and in an effective juvenile hormone mimicking amount when contacting insects in the larval stage.

5. The composition as defined in claim 4 comprising from about 0.0001 to about 0.05 percent by weight of said compound.

6. The composition as defined in claim 4 comprising from about 0.0001 to about 10 percent by weight of said compound.

References Cited
UNITED STATES PATENTS

| | | | |
|---|---|---|---|
| 3,513,176 | 5/1970 | Andrews et al. | 260—348 |
| 2,556,150 | 6/1951 | Wearn et al. | 252—522 |
| 3,573,331 | 3/1971 | Brydon et al. | 260—348 A |
| 3,647,826 | 3/1972 | Hall | 252—522 |

VINCENT D. TURNER, Primary Examiner

U.S. Cl. X.R.

260—468 H; 424—278, DIG 12

PO-1050
(5/69)

UNITED STATES PATENT OFFICE
CERTIFICATE OF CORRECTION

Patent No. 3,826,840                    Dated July 30, 1974

Inventor(s)  JERRY G. STRONG

It is certified that error appears in the above-identified patent and that said Letters Patent are hereby corrected as shown below:

Column 2, line 17 "cyclobutanecarboxylic" should be -- cyclohexanecarboxylic --

Column 2, line 33 "alkylcyclopropanecarboxylic" should be -- allycyclopropanecarboxylic --

Column 2, line 42 "3-(methyl" should be -- 3-(4-methyl --

Column 7, claim 1 "OC-C" should be --OC-CH--

Signed and sealed this 19th day of November 1974.

(SEAL)
Attest:

McCOY M. GIBSON JR.                 C. MARSHALL DANN
Attesting Officer                   Commissioner of Patents